(12) United States Patent
Lin et al.

(10) Patent No.: US 7,417,746 B2
(45) Date of Patent: Aug. 26, 2008

(54) FABRY-PEROT TUNABLE FILTER SYSTEMS AND METHODS

(75) Inventors: Pinyen Lin, Rochester, NY (US); Lalit K Mestha, Fairport, NY (US); Peter M Gulvin, Webster, NY (US); Yao Rong Wang, Webster, NY (US)

(73) Assignee: Xerox Corporation, Stamford, CT (US)

( * ) Notice: Subject to any disclaimer, the term of this patent is extended or adjusted under 35 U.S.C. 154(b) by 386 days.

(21) Appl. No.: 11/319,276

(22) Filed: Dec. 29, 2005

(65) Prior Publication Data

US 2007/0153287 A1 Jul. 5, 2007

(51) Int. Cl.
*G01B 9/02* (2006.01)
*G02B 27/64* (2006.01)

(52) U.S. Cl. ...................... 356/519; 359/556
(58) Field of Classification Search ................ 356/454, 356/480, 519; 359/557, 578, 589
See application file for complete search history.

(56) References Cited

U.S. PATENT DOCUMENTS

| 5,550,373 | A | * | 8/1996 | Cole et al. ................... 356/454 |
| 6,295,130 | B1 | | 9/2001 | Sun et al. |
| 6,678,048 | B1 | * | 1/2004 | Rienstra et al. ............. 356/419 |
| 6,985,233 | B2 | * | 1/2006 | Tuschel et al. .............. 356/454 |
| 7,042,643 | B2 | * | 5/2006 | Miles ......................... 359/578 |
| 2005/0030545 | A1 | * | 2/2005 | Tuschel et al. .............. 356/454 |
| 2006/0221346 | A1 | * | 10/2006 | Mestha et al. ............... 356/454 |
| 2007/0153287 | A1 | * | 7/2007 | Lin et al. .................... 356/454 |
| 2007/0153288 | A1 | * | 7/2007 | Wang et al. ................. 356/454 |

OTHER PUBLICATIONS

U.S. Appl. No. 11/092,635, filed Mar. 30, 2005, Mestha et al.
U.S. Appl. No. 11/092,835, filed Mar. 30, 2005, Wang et al.

\* cited by examiner

*Primary Examiner*—Patrick J Connolly
(74) *Attorney, Agent, or Firm*—Oliff & Berridge, PLC

(57) ABSTRACT

A spectral filter includes a two-dimensional array of Fabry-Perot cavity structures, a controller, and a sampling circuit used to switch the Fabry-Perot cavity. The filter receives an incoming image, the sampling circuit switches the cavity to generate a filter image, and the filtered image is detected by the photodetectors to convert a filtered image into digital data. The controller coordinates all the image capture functions of the spectral filter.

22 Claims, 4 Drawing Sheets

content truncated …

FABRY-PEROT TUNABLE FILTER SYSTEMS AND METHODS

Cross-reference is made to co-pending, commonly assigned applications, U.S. application Ser. No. 11/092,635, filed Mar. 30, 2005, by Mestha et al., entitled "Two-Dimensional Spectral Cameras and Methods for Capturing Spectral Information Using Two-Dimensional Spectral Cameras," and U.S. application Ser. No. 11/092,835, filed Mar. 30, 2005, by Wang et al., entitled "Distributed Bragg Reflector Systems and Methods," and U.S. Pat. No. 6,295,130 issued Sep. 25, 2001, the entire disclosures of which are herein incorporated by reference.

BACKGROUND

Digital cameras are a fast-growing segment of the digital consumer market, and are used largely for producing photographic images. Each pixel of a subject is captured digitally in terms of RGB (red, green and blue) separations.

Digital cameras typically use charged-couple-device (CCD) or complementary metal-oxide semiconductor (CMOS) chips as image sensors. Such CCD or CMOS chips record light from a subject when capturing an image of the subject.

SUMMARY

The above-discussed digital cameras are mainly point-and-shoot cameras which give relatively low-resolution color images. RGB data obtained from such low-resolution cameras give significant color distortions. Thus, such low-resolution digital cameras are not suitable for certain applications, such as non-invasive diagnosis, for example, for diagnosing and monitoring infections, accurate human identifications from color images, provision of human-like computer vision to robots, remote sensing or the like.

Various exemplary systems and methods according to the disclosure in U.S. application Ser. No. 11/092,635, filed Mar. 30, 2005, by Mestha et al., provide low cost spectral cameras, such as two-dimensional spectral cameras, that include a plurality of spectrophotometers, for example, in a two-dimensional array, such as a multiple Fabry-Perot cavity filter with silicon photo-detectors distributed one beside another in a two-dimensional matrix fashion. Each cavity may be designed to capture a pixel from an image. Such spectral cameras may use, for example, Fabry-Perot-type two-dimensional spectral sensors in place of CCD or CMOS RGB chips found in conventional digital cameras. A two-dimensional Fabry-Perot MEMS (micro-electro-mechanical -system) array may function as an image sensor to capture the image in spectral form.

Various exemplary systems and methods according to this disclosure provide a two-dimensional Fabry-Perot MEMS array that may function as a spectral filter. Such a spectral filter uses a Fabry-Perot tunable filter without any photodetectors formed on the same chip where the Fabry-Perot tunable filter is formed. Thus, the spectral filter may, for example, filter an image, and output filtered image information. The filtered image information may also be detected by detectors located at a distance from the spectral filter. The distance may be adjusted to achieve desired resolution of a display generated from the detected filtered image information.

These and other features and details are described in, or are apparent from, the following detailed description.

BRIEF DESCRIPTION OF THE DRAWINGS

Various exemplary details of systems and methods are described, with reference to the following figures, wherein.

DETAILED DESCRIPTION OF EMBODIMENTS

The basic structure of a Fabry-Perot cavity is described in detail in U.S. Pat. No. 6,295,130, and copending application Ser. No. 11/092,635, which are incorporated herein by reference in their entirety. The basic Fabry-Perot cavity includes two micro-mirrors separated by a gap. The gap may be an air gap, or may be filled with liquid or other material. The micro-mirrors include multi-layer distributed Bragg reflector (DBR) stacks or highly reflective metallic layers, such as gold. A voltage applied between the two mirrors may be adjusted to change the distance between the two mirrors. The distance between the two mirrors is also referred to as the dimension or size of the gap. The size of the gap may also be called a height of the gap. Only light with certain wavelengths may be able to pass the gap due to the interference effect of incident light and reflective light.

Figure 1:
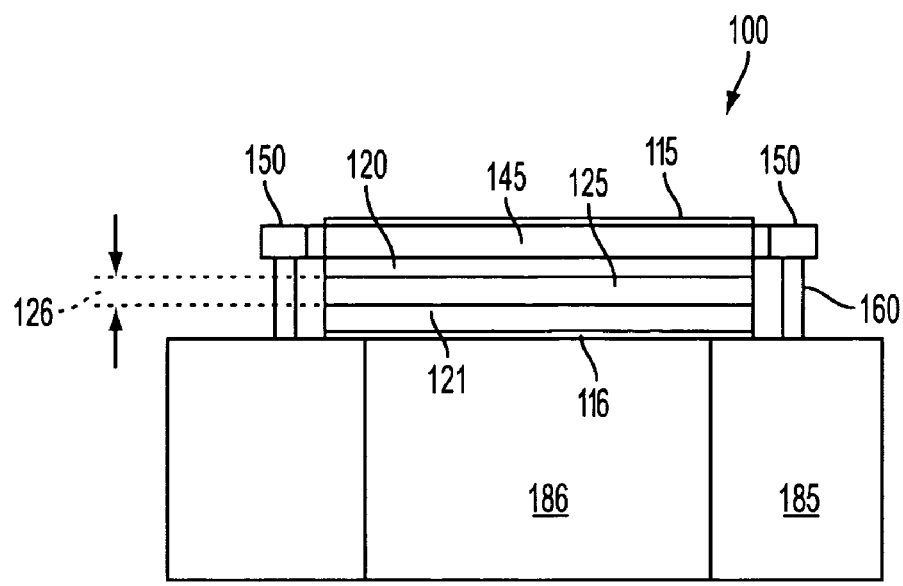
FIG. 1 illustrates a side view of an exemplary Fabry-Perot cavity structure.
Figure 2:
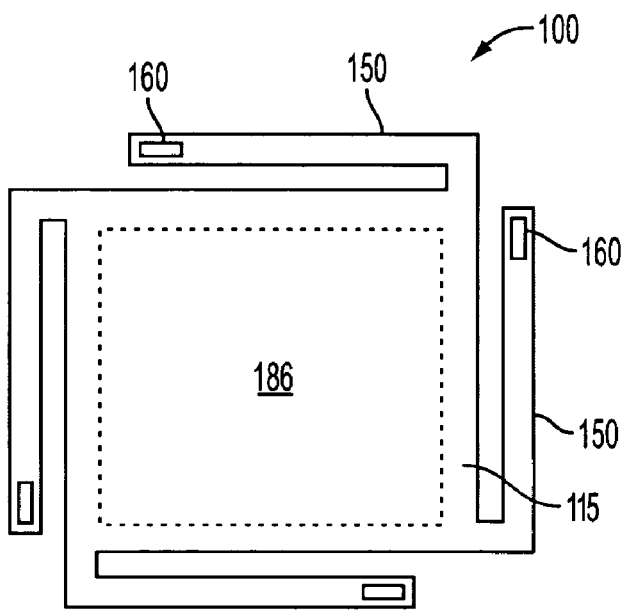
FIG. 2 illustrates a top view of the exemplary Fabry-Perot cavity structure shown in FIG. 1.

FIG. 1 shows a side view of an exemplary embodiment of a Fabry-Perot (F-P) micro-electro-mechanically tunable cavity structure 100. FIG. 2 is a top view of the cavity structure 100. As shown in FIG. 1, the cavity structure 100 may include a top mirror 120 and a bottom mirror 121. In various exemplary embodiments, the bottom mirror 121 may be a bottom distributed Bragg reflector (DBR) mirror that includes three pairs of quarter wavelength Si/SiN$_x$ stacks. The top mirror 120 may be a top distributed Bragg reflector (DBR) mirror that includes two pairs of quarter wavelength Si/SiN$_x$ stacks.

As shown in FIG. 1, the cavity structure 100 may also include a top electrode 115 and a bottom electrode 116. The top electrode 115 may be formed on the top mirror 115 via a support element 145. The bottom electrode 116 may be sandwiched between the bottom mirror 121 and a substrate 185.

The substrate 185 may have a portion 186 that maybe a hole or a transparent part. The support element 145 may be a transparent substrate. The top electrode 115 and the bottom electrode 116 may be transparent electrodes. Indium tin oxide (ITO) may be used for the transparent bottom electrode 116 and the transparent top electrode 115.

The top and bottom mirrors 120 and 121 may be separated by a gap cavity 125. The gap cavity 125 may be maintained in a variety of ways. In various exemplary embodiments, the gap cavity 125 may be maintained using a plurality of springs 150. As shown in FIGS. 1 and 2, each of the plurality of springs 150 corresponds to a respective one of a plurality of anchors 160. The plurality of springs 150 are connected to the support element 145 such that the top mirror 120 is kept away from the bottom mirror 121 by the gap cavity 125.

The gap cavity 125 may be characterized by the distance 126 between the top and bottom mirrors 120 and 121. The distance 126 represents a dimension of the gap cavity 125, and may be referred to as a size or height of the gap cavity 125.

The size 126 may be changed or otherwise adjusted. For example, top mirror 120 may be deformed to a dimensional change in the gap cavity 125 by applying a voltage in the range of 5-100 volts across transparent bottom electrode 116 and transparent top electrode 115, or a charge in the range of $10^{-11}$ coulombs on transparent bottom electrode 116 and transparent top electrode 115 to effect a change in the size 126 of gap cavity 125 of about 300 to 500 nm. Hence, electrodes 115 and 116 may form a capacitor and the Fabry-Perot cavity structure 100 may have an associated capacitance. As the size 126 of gap cavity 125 decreases, for example, the Fabry-Perot transmission peak shifts to shorter wavelengths.

The size 126 may be changed in a variety of ways. For example, the size 126 may be changed in a way in which the top mirror 115 stays stationary, while the bottom mirror 116 moves relative to the top mirror 115. Alternatively, the size 126 may be changed in a way in which the bottom mirror 116 stays stationary, while the top mirror 115 moves relative to the bottom mirror 116. Alternatively, the size 126 may be changed in a way in which both the top mirror 115 and the bottom mirror 116 are moving relative to each other. In various exemplary embodiments, the top mirror 115 and the bottom mirror 116 maintain parallelism with each other regardless of the relative movement between them.

Furthermore, the size of the gap cavity 125 may be changed by a mechanism other than application of a voltage. For example, the size of gap cavity 125 may be changed by a mechanical, thermal or magnetic mechanism.

In the cavity structure 100 shown in FIG. 1, light may be received at the top of the cavity structure 100 through the top electrode 115. The received light may be transmitted through the gap cavity 125 and the portion 186 of the substrate 185 at a tuned wavelength.

Figure 3:
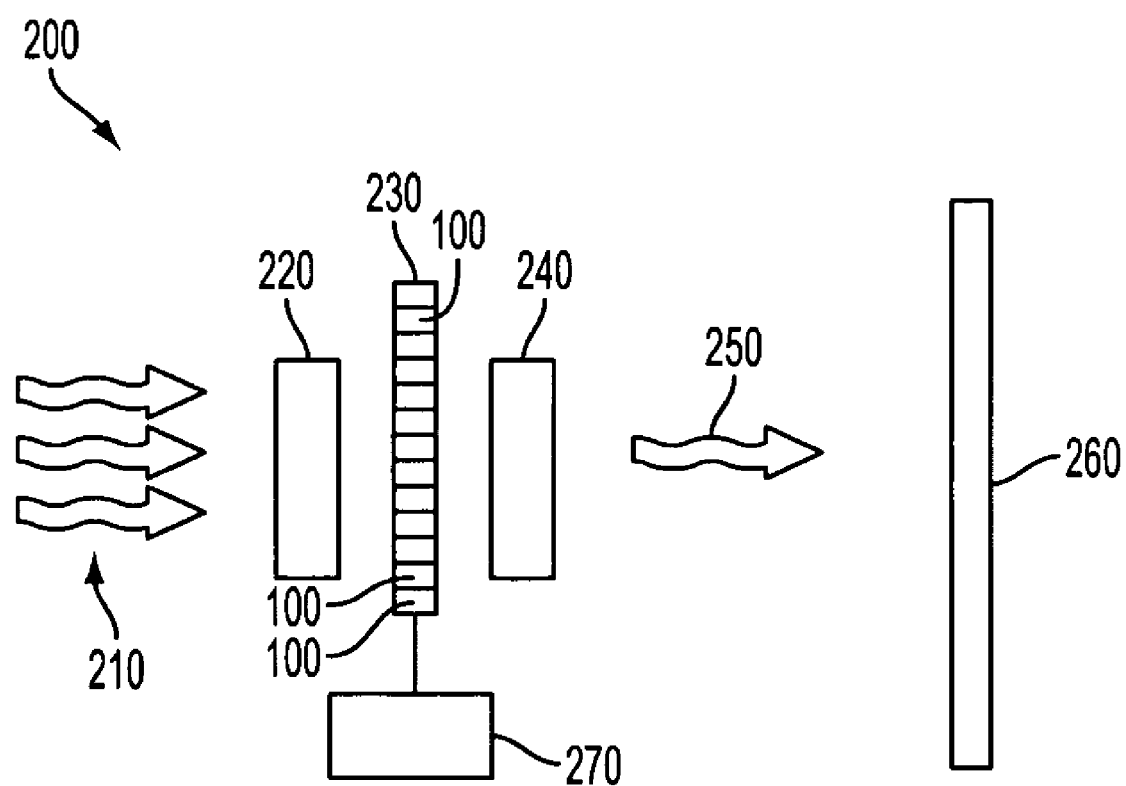
FIG. 3 illustrates an exemplary Fabry-Perot optical system having a spectral filter array.

FIG. 3 illustrates an exemplary Fabry-Perot optical system having a spectral filter array. As shown in FIG. 3, the Fabry-Perot optical system 200 provides a Fabry-Perot tunable filter array 230. Each element of the filter array 230 may be a cavity structure 100 shown in FIG. 1.

The filter array 230 may be located between a first optical lens 220 and a second optical lens 240. Optical images passed through the lens 220 become collimated to increase the efficiency and resolution of the Fabry-Perot optical system 200.

The first and second optical lenses 220 and 240 may be selected from a variety of lenses based on different purposes. For example, in various exemplary embodiments, the first optical lens may be a convex lens, and the second optical lens may be a concave lens. Also, one or more of the first and second optical lenses 220 and 240 may be omitted, depending on different embodiments.

The Fabry-Perot tunable filter array 230 may be connected to a switching circuit 270. The size of the cavity in each of the cavity structure may be adjusted by, for example, the switching circuit 270, to give a desired transmissive frequency or frequencies. The switching circuit 270 may be a controller that provides the desired frequency or frequencies. The provision of desired frequency or frequencies may be from, for example, a user interface that receives input from a user. The switching circuit 270 may also be a sampling circuit that provides modulation data that contains modulation signals to select the desired frequency or frequencies. One cavity structure may correspond to one pixel of an incoming image 210. As a result, the incoming image 210 may be filtered to produce a filtered image 250, such as a spectral image produced by filtering the incoming image 210 at a wavelength corresponding to the size of the cavity. The filtered image 250 may be output through an output device (not shown). Alternatively, the filtered image 250 may be detected by a detector 260. The detector 260 may be an array of CCD or CMOS sensors.

As discussed above, the size of the cavity is adjustable. Thus, the filtered image may be generated at any wavelength covered by the spectral space within the adjustable range of the gap cavity. Thus, the filtered image will be generated in various wavelengths by adjusting the size of the gap cavity to transmit selectively very narrow wavelengths or collectively a group of wavelengths of the pixels of the incoming image 210.

The filter array may be a two-dimensional array of thin membranes and may be matrix addressable as a group, or the thin membranes may be addressable independently. The membranes may be addressed by actuating voltage signals according to modulation signals. The modulation may be actuated to drive each cavity 100 to achieve desired spectral resolution. When parallel actuation is desired, such an actuation may be carried out by actuating the two-dimensional array simultaneously. In a parallel actuation, two parallel mirrors of Fabry-Perot device moves close to each other or away from each other and still maintain their parallelism.

Higher spatial resolution of an image may be obtained by arranging combinations of a plurality of Fabry-Perot cells on the filtered chip and the plurality of sensors on the detector chip in a grid fashion. A Fabry-Perot cell may include the plurality of gap cavities, each cavity being, for example, a cavity structure 100.

Spectral resolution of the filter array 230 may depend on the mean reflectivity of the mirrors forming the gap cavity 125. The spectral range of a gap cavity may depend on the initial size of the gap cavity and the quarter wavelength Si/SiNx stacks that may be used. For light in the infrared region, the size of gap cavity 125 may be on the order of the infrared wavelength range. When the tuning range of the gap cavity 125 is limited because of, for example, structural limitations, a system consisting of more than one membrane with different initial size of gap cavity and different quarter wavelength stacks may be used to cover a broader spectral range. Such a system may be designed to cover a spectrum range from ultra-violet (UV) to infrared (IR). A detailed description of such a system is provided in copending application Ser. No. 11/092,835 filed Mar. 30, 2005, by Wang et al., the entire disclosure of which is herein incorporated by reference.

In FIG. 3, the filter array 230 may be made of an array of small-sized micro Fabry-Perot interferometers. Such a structure may ensure the parallel actuation of the Fabry-Perot interferometers. Such a structure may also improve the uniformity among the Fabry-Perot interferometers, because each cavity may be individually adjusted based on calibration data containing calibration signals. The calibration may be conducted by, for example, the switching circuit 270.

In FIG. 3, the optical lenses 220 and 240 provide collimation of light. For example, the first optical lens 220 collimates light of the incoming image 210 to the filter array 230.

As shown in FIG. 3, the detector 260 is separated from the filter array 230 by the second lens 240. Thus, the filter array 230 may be formed on a chip on which the detector 260 is not formed, i.e., a different chip. With such an arrangement, the detector 260 may be made with high resolution. For example, the size of a CCD, which acts as a detector array, may be made much larger than that of the aperture 199, because the CCD may be placed at a distance from the filter array 230. Also, the second optical lens 240 may be located between the filter array 230 and the detector 260, because the detector 260 is separate and at a distance from the filter array 230. The second optical lens 240 may collimate the filtered image 250 from the filter array 230 to the detector 260, such that the light beams reaching the detector 260 are parallel light beams.

With the structure in which the filter array 230 is formed on a chip without the detector 260, the Fabry-Perot optical system 200 may be used without the detector 260, so that it may function as a filter. Alternatively, the Fabry-Perot optical system 200 may also be used in combination with the detector 260, so that the filtered image 250 may be detected by the detector 260. The detected image may be displayed on a display device, such as a liquid crystal display device (not shown).

Figure 4:
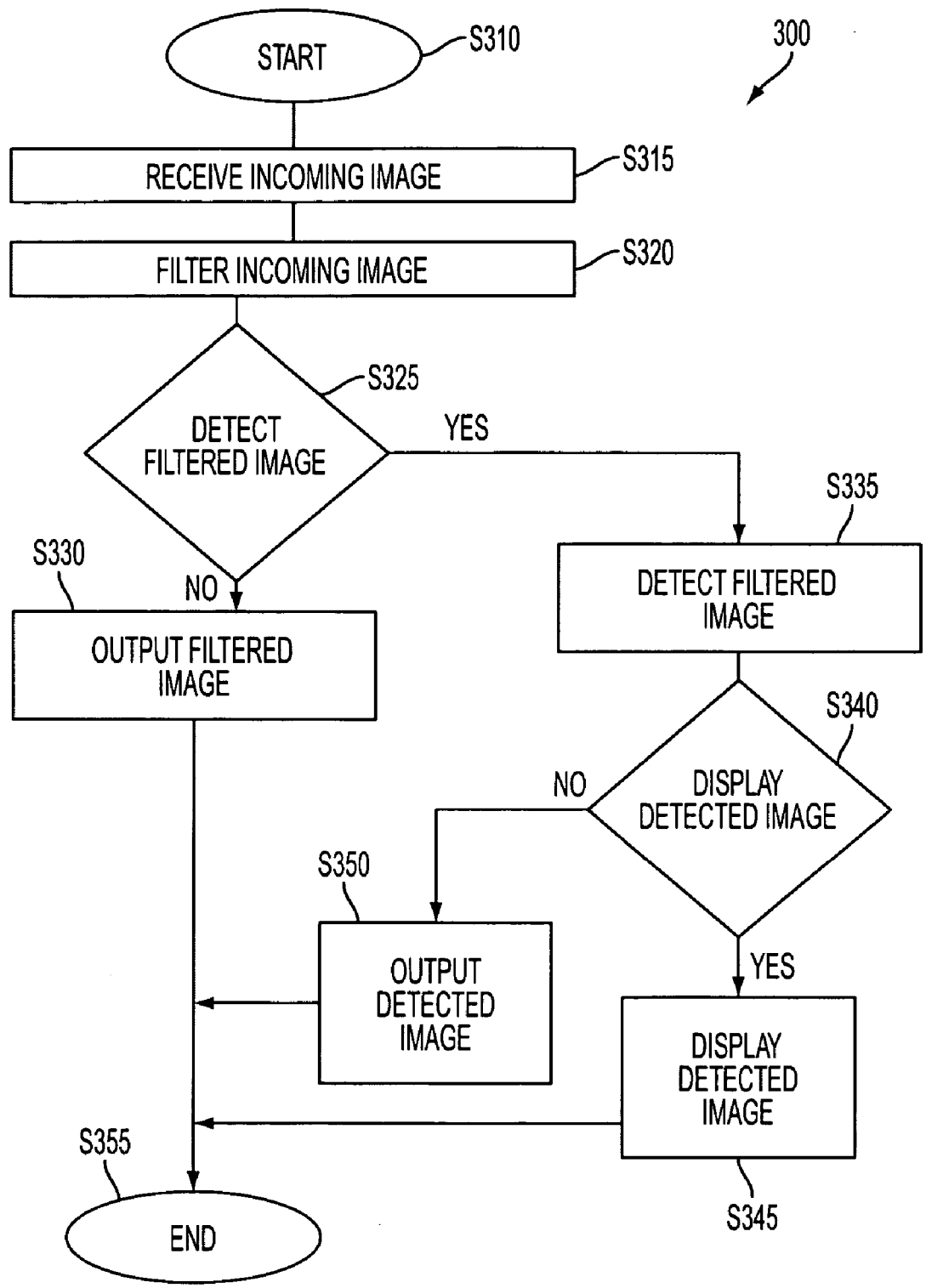
FIG. 4 outlines an exemplary process for filtering an image using a spectral filter array.

FIG. 4 outlines an exemplary process for filtering an image using a spectral filter. As shown in FIG. 4, starting from step S310, the process proceeds to step S315, where an incoming image is received. Next, at step S320, the incoming image is filtered using a Fabry-Perot filter array with selected spectral filter characteristics, such as gap cavity size. The process then proceeds to step S325.

At step S325, a determination is made whether to detect the filtered image to generate a spectral image. If it is determined at step S325 that the spectral image is not to be generated, the process proceeds to step S330, where the filtered image is output. Thereafter, the process continues to step S355, where the process ends.

On the other hand, if it is determined, at step S325, that a spectral image is to be obtained, the process proceeds to step S335, where the filtered image is detected using a sensor located at a selected distance from the filter array, so as to generate a spectral image. The distance may be adjustable and selected to obtain a desired spectral image resolution. The process then continues to step S340.

At step S340, it is determined whether the detected spectral image is to be displayed. If it is determined, at step S340, that the detected spectral image is not to be displayed, the process continues to step S350, where the detected spectral image is output.

On the other hand, if it is determined, at step S340, that the detected spectral image is to be displayed, the process proceeds to step S345, where the detected spectral image is displayed. Thereafter, the process continues to step S350, where the detected spectral image is output.

Finally, the process continues from step S350 to step S355, where the process ends. It is understood that one or more of the steps in FIG. 4 may be omitted.

The method illustrated in FIG. 4 may be implemented in a computer program product that may be executed on a computer. The computer program product may be a computer-readable recording medium on which a control program is recorded, or may be a transmittable carrier wave in which the control program is embodied as a data signal.

Figure 5:
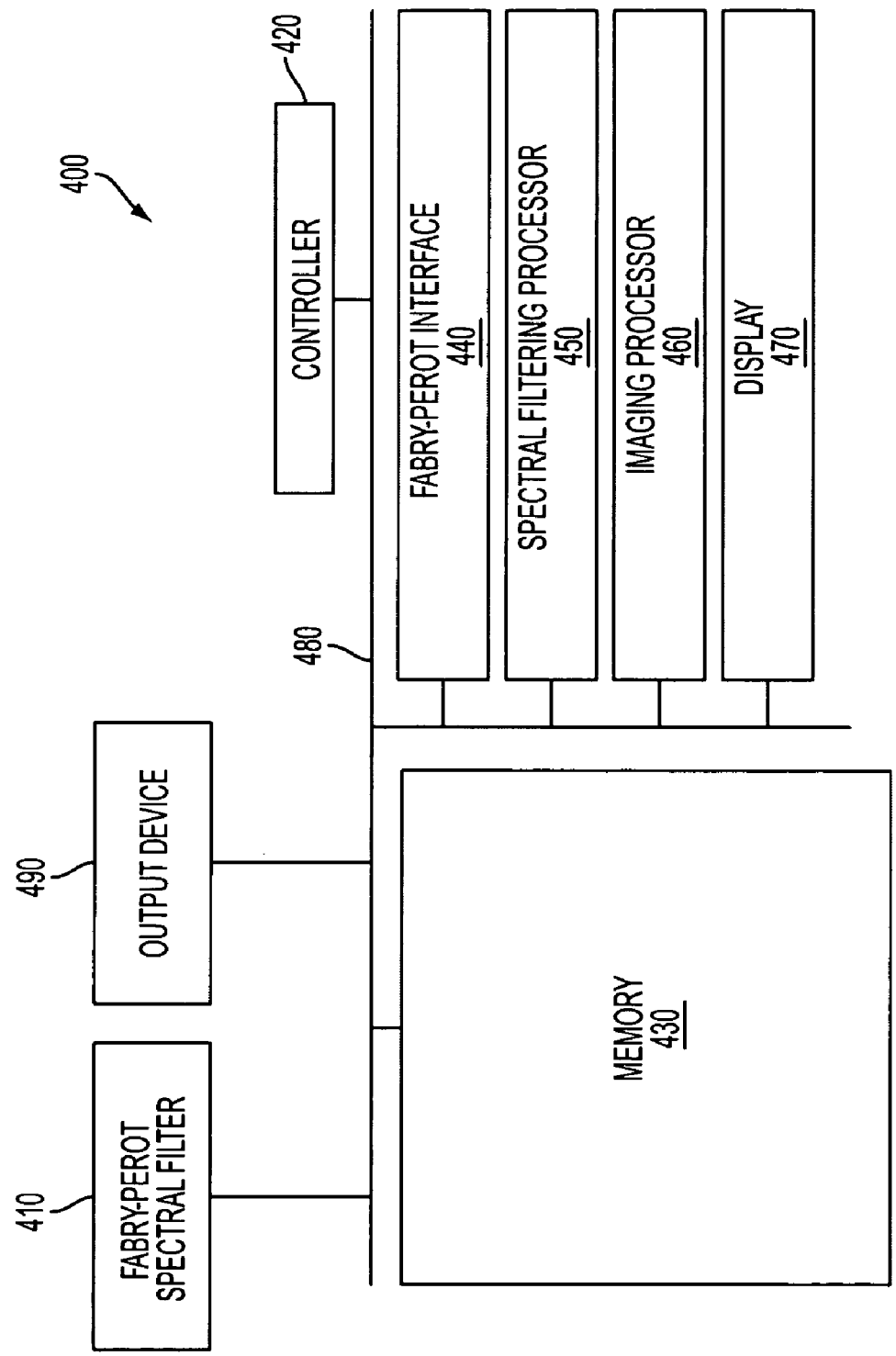
FIG. 5 is a block diagram illustrating an exemplary spectral filter system.

FIG. 5 illustrates a block diagram of an exemplary spectral filter system 400. As shown in FIG. 5, the spectral filter system 400 may include a Fabry-Perot spectral filter 410, such as the Fabry-Perot optical system 200 illustrated in FIG. 3, a controller 420, a memory 430, a Fabry-Perot interface 440, a spectral filter processor 450, an image processor 460 and a display 470, each connected by connection or bus 480.

The Fabry-Perot filter array 410 may include a sampling circuit, such as the switching circuit 270 shown in FIG. 3, that switches a cavity to a desired size for sampling the image at a corresponding wavelength, and obtains spectrally decomposed images or other spectral information from an incoming image. The desired wavelength may be provided to the sampling circuit a priori or preset based on the image. Such spectral images and spectral information may include hyperspectral images. The sampled spectral information or hyper spectral image may be converted to a digital signal at the output of the detector 260. The sampling circuit 270 and the detector 260 will coordinate the switching of the cavities and the signal detection. The controller 420 synchronizes all major events that take place while capturing the spectral information of the image. The controller 420 may also direct the Fabry-Perot interface 440 to receive input from a user.

The controller 420 may control the position of the first lens 220 for appropriate collimation. The controller 420 may also control the position of the second optical lens 240 for collimation desired for, for example, casting a filtered image to the detector 260. The controller 420 may also coordinate the synchronization between the sampling circuit 270 and the detector 260 functions so as to sample and save wavelength based information of the incoming image.

In operation, various elements shown in FIG. 5 perform their respective functions under control of the controller 420. For example, the Fabry-Perot spectral filter 410 receives an incoming image and communicates with spectral filter processor 450 via Fabry-Perot interface 440 to filter the incoming image to generate a filtered image. The imaging processor 460 may communicate with a detector, such as the detector 260 connected to the spectral filter 200 shown in FIG. 3, to obtain a detected spectral image. The display 470 may display the detected spectral image, if necessary. The image processor 460 may supply the image data to the display. The controller 420 may coordinate the display function with the imaging processor. The filtered image and the detected spectral image may be output through output device 490, or may be stored in memory 430. The image processor 460 may compress the image data prior to saving.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. A spectral filter, comprising:
   a two-dimensional array of Fabry-Perot cavity structures formed on a first chip, the first chip containing no photodetectors, the Fabry-Perot cavity structures being continuously tunable over a range;
   a controller connected to the two-dimensional array; and
   a sampling circuit controlled by the controller,
   wherein the Fabry-Perot cavity structures to receives an incoming image, the sampling circuit switches the Fabry-Perot cavity structures to generate a filtered image of the incoming image.

2. The spectral filter according to claim 1, further comprising an optical lens that collimates light of the incoming image before the incoming image reaches the Fabry-Perot cavity structures.

3. The spectral filter according to claim 1, wherein the filtered image is output to a detector formed on a second chip, the second chip being different and at a distance from the first chip.

4. The spectral filter according to claim 3, further comprising an optical lens located between the first and second chips to receive collimated filtered image from the Fabry-Perot cavity structure and to expand the filtered image before the filtered image reaches the second chip.

5. The spectral filter according to claim 3, wherein the detector comprises an array of charged-couple-device (CCD) or complementary metal-oxide semiconductor (CMOS) chips.

6. The spectral filter according to claim 3, wherein the detector is sampled and the detected signal for all corresponding wavelengths is collected and saved to form complete digital image files.

7. The spectral filter according to claim 3, wherein the image files may be stored in compressed form.

8. The spectral filter according to claim 1, wherein each of the Fabry-Perot cavity structures comprises a first mirror and a second mirror, the first and second mirrors are located apart from each other at a gap distance, and the controller adjusts the gap distance based on modulation signals.

9. The spectral filter according to claim 1, wherein each of the Fabry-Perot cavity structures comprises a pair of membranes and the controller adjusts a distance between the pair of membranes based on modulation signals.

10. The spectral filter according to claim 1, wherein the controller adjusts a gap size of each of the Fabry-Perot cavity structures based on calibration signals.

11. An optical apparatus, the optical apparatus comprising the spectral filter according to claim 1.

12. A method of filtering an image using a spectral filter, the spectral filter comprising:

a two-dimensional array of Fabry-Perot cavity structures formed on a first chip, the first chip containing no photodetectors, the Fabry-Perot cavity structures being continuously tunable over a range;

a controller connected to the two-dimensional array; and a sampling circuit controlled by the controller, the method comprising:

receiving an incoming image at the Fabry-Perot cavity structures;

the sampling circuit switches the Fabry-Perot cavity structures to generate a filtered image of the incoming image, and outputting the filtered image.

13. The method of claim 12, the spectral filter further comprising an optical lens, the method further comprising collimating light of the incoming image before the incoming image reaches the Fabry-Perot cavity structures.

14. The method of claim 12, wherein the filtered image is output to a detector formed on a second chip, the second chip being different and at a distance from the first chip.

15. The method of claim 14, the spectral filter further comprising an optical lens located between the first and second chips, the method further comprising receiving collimated filtered image from the Fabry-Perot cavity structure and expanding the filtered image before the filtered image reaches the second chip.

16. The method of claim 14, wherein the detector comprises an array of charged-couple-device (CCD) or complementary metal-oxide semiconductor (CMOS) chips.

17. The method according to claim 14, wherein the detector is sampled and the detected signal for all corresponding wavelengths is collected and saved to form complete digital image files.

18. The method according to claim 17, wherein the image files may be stored in compressed form.

19. The method of claim 12, wherein each of the Fabry-Perot cavity structures comprises a first mirror and a second mirror, the first and second mirrors are located apart from each other at a gap distance, the method further comprising adjusting the gap distance based on modulation signals from the controller.

20. The method of claim 12, wherein each of the Fabry-Perot cavity structures comprises a pair of membranes, the method further comprising adjusting a distance between the pair of membranes based on modulation signals from the controller.

21. The method of claim 12, further comprising adjusting a gap size of each of the Fabry-Perot cavity structures based on calibration signals from the controller.

22. A computer program product including computer-executable instructions for performing the method recited in claim 12.

* * * * *